United States Patent [19]

Tomioka et al.

[11] 4,291,926

[45] Sep. 29, 1981

[54] GUIDE BEARING DEVICE

[75] Inventors: Shunzo Tomioka; Kinpei Okano; Masanori Matsuo; Yosio Furukawa, all of Hitachi, Japan

[73] Assignee: Hitachi, Ltd., Tokyo, Japan

[21] Appl. No.: 77,836

[22] Filed: Sep. 21, 1979

[30] Foreign Application Priority Data

Sep. 22, 1978 [JP] Japan ................................ 53-115926

[51] Int. Cl.³ ........................ F16C 17/03; F16C 33/02
[52] U.S. Cl. ..................................... 308/73; 308/122
[58] Field of Search ............................. 308/9, 73, 122

[56] References Cited

U.S. PATENT DOCUMENTS

| 1,161,721 | 11/1915 | Parsons | 308/73 |
| 2,936,197 | 5/1960 | Weiler | 308/73 |
| 3,004,804 | 10/1961 | Pinkus et al. | 308/73 |
| 3,297,371 | 1/1967 | Salzman | 308/73 |
| 3,936,103 | 2/1976 | Byrns et al. | 308/73 |
| 3,951,475 | 4/1976 | Okano et al. | 308/73 |

FOREIGN PATENT DOCUMENTS 957087  1/1957  Fed. Rep. of Germany ........ 308/73
17-19683 11/1942 Japan .
547306  8/1942  United Kingdom .................. 308/73

Primary Examiner—Richard R. Stearns
Attorney, Agent, or Firm—Craig and Antonelli

[57] ABSTRACT

A guide bearing device for vertical rotary shafts including a plurality of segmental pads disposed circumferentially equidistantly around the rotary shaft, a plurality of adjusting bolts each supporting the respective segmental pads for pivotal movement, a housing containing the segmental pads and adjustably mounting the adjusting bolts and filled with lubricating oil, and a plurality of cooling pads each formed with an oil passage and arranged between the two adjacent segmental pads for pivotal movement, each of the cooling pads defining between its inner surface and the outer circumferential surface of the rotary shaft a gap which is thicker than the gap defined between a sliding surface of the respective segmental pads and the outer circumferential surface of the rotary shaft, said oil passage of each cooling pad communicating with a pressurized oil supply source and discharging lubricating oil toward the outer circumferential surface of the rotary shaft.

6 Claims, 3 Drawing Figures

GUIDE BEARING DEVICE

BACKGROUND OF THE INVENTION

This invention relates to guide bearing devices for rotary shafts of high speed of rotation, and more particularly to guide bearing devices of the type described provided with cooling pads designed to prevent scattering of lubricating oil and increase the cooling effect of the bearing.

In vertical rotary machines such as hydraulic water turbines and generators, there has in recent years been a tendency toward larger sizes for increasing the capacity per machine, and rotary shafts of such machines are rotated at high peripheral velocities under high load. Oil film lubricating bearings support such rotary shafts by causing dynamic pressure produced in lubricating oil due to rotation of the rotary shaft to act as oil film pressure in a bearing gap between the rotary shaft and the bearing. Segmented bearings for guiding a vertical rotary shaft are known as oil film lubricating bearings which comprise a plurality of segmental pivoted bearing pads arranged circumferentially equidistantly around the rotary shaft and a plurality of adjusting screws each having a spherical-shaped end adapted to abut against a supporting plate of each segmental pad. In vertical rotary machines of large size, a rotary shaft rotates at high peripheral velocity to cause scattering of lubricating oil or violent undulation of the surface of lubricating oil. As a result, lubricating oil film will become broken between the rotary shaft and the bearing, or temperatures of the lubricating oil or bearing will rise, thereby rendering the performance of the bearing unstable. Scattering of lubricating oil will grow in intensity with an increase in the peripheral velocity of rotary shafts to produce a mist of lubricating oil, thereby causing leakage of the oil leading to environmental pollution in and around the equipment. Various proposals have been made to solve these problems. For example, Japanese Utility Model Publication No. 19683/67 discloses a segment type guide bearing which comprises a plurality of segmental pivoted bearing pads each having a sliding bearing surface formed with an oil groove for introducing therethrough a fresh supply of cold lubricating oil thereto. With the arrangement of the Publication, however, the sliding surfaces of segmental pads and the outer peripheral surface of the rotary shaft are spaced apart from one another by a small gap, so that lubricating oil introduced to the sliding surfaces of segmental pads through the oil grooves is limited in amount. If insufficient lubricating oil is introduced, the result will be an insufficient cooling effect. In addition, the oil grooves in the bearing described above are formed in the precisely finished sliding surfaces of segmental pads.

SUMMARY OF THE INVENTION

It is an object of the present invention to provide a guide bearing device which obviates the problems of prior art guide bearing devices with regard to insufficient lubricating oil being introduced to the sliding surfaces of their bearing pads, and avoiding difficulties in machining and maintenance of the precisely finished sliding surfaces of segmental bearing pads that have oil grooves formed therein.

The aforesaid object is accomplished by providing between adjacent segmental pads oil supply means for forcedly supplying lubricating oil of sufficient amount, as by pump, to the segmental pads.

DESCRIPTION OF THE PREFERRED EMBODIMENTS

Figure 1:
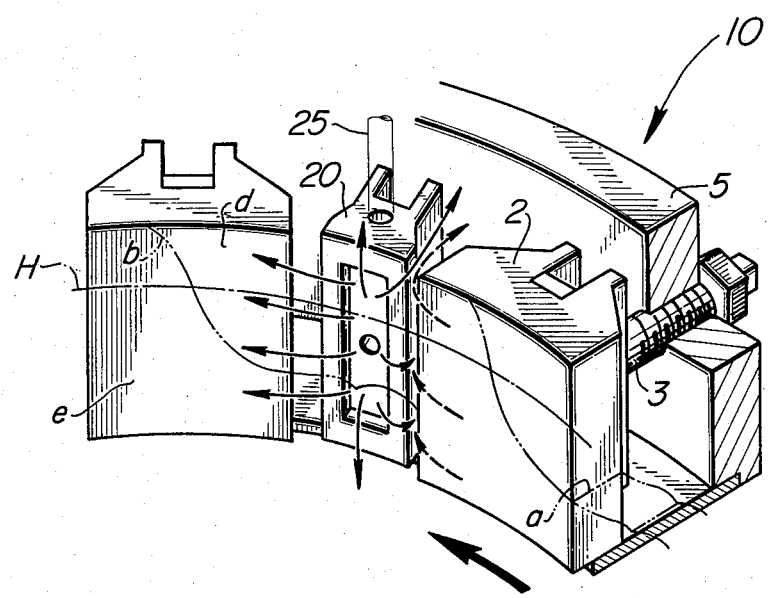
FIG. 1 is a fragmentary perspective view of a guide bearing device according to an embodiment of the invention, with a rotary shaft being removed.
Figure 2:
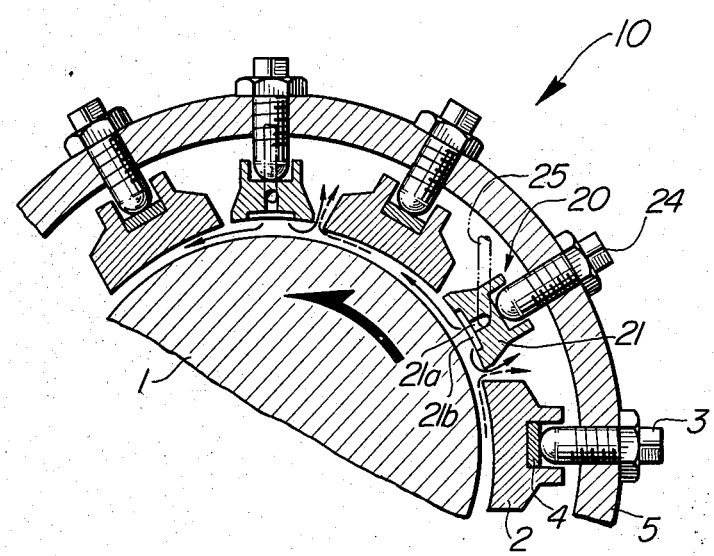
FIG. 2 is a fragmentary horizontal sectional view of the device shown in FIG. 1.

Referring to FIGS. 1 and 2, there is shown a segmented bearing 10 according to one embodiment of the invention which serves to guide a vertical rotary shaft. The segmented bearing 10 comprises a plurality of segmental pivoted bearing pads 2 disposed in a space between a rotary shaft 1 and a housing 5 and arranged circumferentially equidistantly around the rotary shaft 1, a plurality of supporting plates 4 each fitted in a recess formed on the rear side of the respective segmental pads 2, a plurality of adjusting bolts 3 each having a spherical-shaped end and adjustably threaded into the housing 5 to abut against one of the support plates 4, and a plurality of oil supply means 20 each interposed between adjacent segmental pads 2. Each segmental pad 2 has an arcuate-shaped inner surface concentric with the rotary shaft 1, which inner surface defines between the same and the outer surface of the rotary shaft 1 a gap capable of being adjusted in thickness by the adjusting bolt 3. Each oil supply means 20 supplies lubricating oil to the segmental pad 2 disposed adjacent the same in the direction of rotation of the rotary shaft 1 but exhibits no bearing action for the rotary shaft 1.

As shown in FIG. 2, each oil supply means 20 comprises an adjusting bolt 24 threadably extending through the housing 5 and having a spherical-shaped end, a cooling pad 21 of a substantially trapezoidal shape in cross section, and a conduit 25 connected at one end to the cooling pad 21 and communicated with a pressure oil source such as oil pump. The cooling pad 21 is formed with a passage 21a for passing low pressure oil therethrough, and an oil distribution groove 21b and communicating with the passage 21a. The inner surface of the cooling pad 21 and the outer peripheral surface of the rotary shaft 1 define therebetween a gap which is in the range of 1 to 3 mm and is twice or more as thick as the gap defined between the sliding surface of the segmental pad 2 and the outer peripheral surface of the rotary shaft 1. It is to be noted that the cooling pads 21 thus exhibit no bearing action for the rotary shaft 1. The conduit 25 is connected to the cooling pad 21 as by a universal joint (not shown) or includes a length of flexible tube interposed midway, so that free swinging movement of the cooling pad 21 is not obstructed by the presence of the conduit 25.

The behavior of lubricating oil flowing about the arcuate-shaped inner surface of each segmental pivoted bearing pad 2 and in the neighborhood thereof when the rotary shaft 1 rotates at high peripheral velocities will be described. When the rotary shaft 1 is stationary, lubricating oil existing between the housing 5 and rotary shaft 1 is at a level of a predetermined value H, as shown in FIG. 1. The rotary shaft 1 agitates the lubricating oil during rotation to undulate the surface of the oil. The condition of lubricating oil prevailing when no oil supply means 20 is provided is indicated by alternate long and two short dashes line in FIG. 1. The level of lubricating oil becomes lower than the predetermined level H at the entrance portion of the segmental pads 2 as indicated by a in FIG. 1, and there is produced an area d on the arcuate-shaped inner surface or sliding surface of each segmental pad 2, at which area the lubricating oil film is broken or no lubricating oil film is present. As shown in FIG. 1, the oil film break area d is located in the upper portion of the sliding surface of each segmental pad 2 adjacent the entrance portion thereof, and an area e where lubricating oil film is present to produce pressure is separated from the oil film bread area d by an inclined curve b. When there is produced such oil film break area d, the bearing 10 is decreased in its capacity for load to become incapable of bearing the load of the rotary machine, thereby causing abnormal vibrations. Also, such creation of oil film break areas d results in a reduction in the amount of lubricating oil flowing through the gap defined between the arcuate-shaped inner surface of each segmental pad 2 and the outer circumferential surface of the rotary shaft 1, thereby bringing about insufficient cooling of the bearing 10 and shaft 1 to subject them to high temperature or burn-out. As the rotary shaft 1 rotates at higher peripheral velocities, the level of lubricating oil within the housing 5 falls in the vicinity of the entrance portion of each segmental pad 2 and the surface of lubricating oil begins to undulate violently, thereby producing oil mist leading to leakage of lubricating oil and pollution in and around the rotary machine.

In the meantime, where oil supply means 20 according to the invention are provided, the lubricating oil within the bearing device 10 behaves as follows. More specifically, each segmental pad 2 is immersed in the oil of a predetermined level H, as shown in FIG. 1, when the rotary machine is stationary. When the vertical type rotary machine is started up, the segmental pads 2 pivot on the spherical-shaped ends of the bolts 3 due to hydrodynamic lubricating action dependent upon the revolving speed of the shaft 1 to exhibit oil film effect, thereby producing oil film pressures between the rotary shaft 1 and the bearing device 10. The cooling pad 21 of each oil supply means 20 receives a supply of lubricating oil of a suitable amount through the conduit 25 and the passage 21a from outside as by hydraulic pump (not shown). The lubricating oil released from the oil distribution groove 21b of the cooling pad 21 flows branchedly leftwardly and rightwardly. The stream of lubricating oil flowing in the direction of rotation of the rotary shaft 1 enters the entrance portion of the adjacent segmental pad 2 to form an oil film between the entire arcuate-shaped inner surface of the segmental pad 2 and the outer circumferential surface of the rotary shaft 1. Meanwhile the stream of lubricating oil flowing in the opposite direction to the direction of rotation of the rotary shaft 1 scrapes off high temperature lubricating oil discharged from the adjacent segmental pad 2 to prevent hot oil carry-over phenomenon in which the high temperature oil flows directly to the next segmental pad 2, as shown in FIGS. 1 and 2. As described hereinabove, the lubricating oil supplied under pressure to each cooling pad 21 is capable of maintaining the oil film on the entire bearing inner surface of each segmental pad 2 even if the surface of lubricating oil is caused to undulate within the housing 5 and the level thereof becomes low with an increase in the peripheral velocity of the rotary shaft 1. Also, the lubricating oil thus freshly supplied scrapes off that hot oil at the exit portions of the segmental pads 2 which has been heated by oil shearing heat generated due to rotation of the rotary shaft 1, thereby preventing such hot oil from directly entering the succeeding segmental pad. In this way, oil film break areas are eliminated which would be produced at the bearing inner surface of each segmental pad due to scattering of the lubricating oil, and troubles such as temperature rise of the bearing device 10 due to hot oil can be avoided.

As shown in FIG. 2, each cooling pad 21 is supported by the adjusting bolt 24 having a pivot point and threaded into the housing 5. However, each cooling pad 21 may be secured to the housing 5 as by welding, or may be supported by a resilient member formed as of rubber or spring. Preferably, each cooling pad 21 is pivotably supported by the adjusting bolt 24 in the interest of adjustment of the gap defined between the cooling pad 21 and the rotary shaft 1 and assembly of the parts of the bearing device 10.

Figure 3:
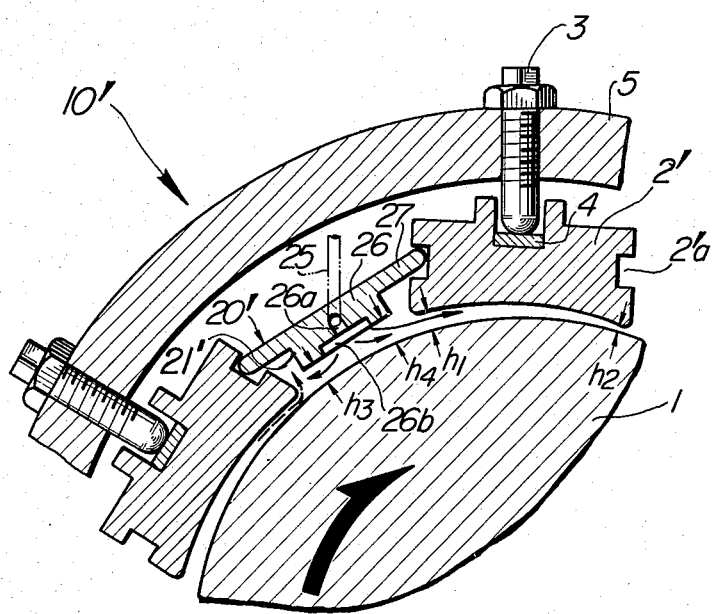
FIG. 3 is a fragmentary horizontal sectional view of the guide bearing device according to another embodiment of the invention.

In FIG. 3, there is shown a segmented bearing 10' according to another embodiment of the invention for guiding a vertical rotary shaft. Parts similar to those of the bearing 10 shown in FIG. 1 are designated by like reference numerals. In FIG. 3, each segmental pad 2' is formed with recesses 2'a on opposite sides thereof, and each cooling pad 21' of oil supply means 20' is interposed between the respective segmental pads 2' and comprises a main body 26 and connecting portions 27. The main body 26 is formed with an oil introducing passage 26a and an oil distribution groove 26b, which passage is maintained in communication with an outside pressurized oil supply source through a conduit 25. The connecting portions 27 of each cooling pad 21' are in the form of bars integrally secured to the opposite sides of the main body 26 and rounded at their side edges, so that when the connecting portions 27 are engaged in the recesses 2'a of the segmental pads 2' the cooling pad 21' can smoothly pivot.

In operation, upon rotation of the rotary shaft 1 at high peripheral velocities an oil film of wedge shape is formed between the sliding surface of each segmental pad 2' and the outer circumferential surface of the rotary shaft 1, which wedge-shaped oil film has a thickness h1 at the oil entering side of the segmental pad 2' and a thickness h2 at the oil leaving side of the pad 2'. Each cooling pad 21' is engaged with the two adjacent segmental pads 2' and is influenced by said tilting thereof, so that an oil film produced between each of cooling pads 21' and the rotary shaft 1 becomes wedged-shaped to thicken in the direction of rotation and has a larger thickness h4 at the end of the main body 26 in the direction of rotation of the rotary shaft 1 and a smaller thickness h3 at the end of the main body 26 in the opposite direction to the direction of rotation of the rotary shaft 1. Thus the cold lubricating oil freshly supplied to each cooling pad 21' from the outside pressurized oil supply source is fed in greater amount to the adjacent segmental pad 2' located in the direction of rotation of the rotary shaft 1, thereby sufficiently cooling the segmental pads 2' and the rotary shaft 1 and eliminating generation of oil film break areas between the rotary shaft 1 and the segmental pads 2'.

What is claimed is:
1. A guide bearing device comprising;
   a plurality of first segmental pads disposed circumferentially equidistantly around a rotary shaft;

means for supporting each of said first segmental pads for pivotal movement; and a housing mounting therein said first segmental pads and said supporting means and containing lubricating oil; wherein the improvement comprises a plurality of second segmental pads each interposed between the first respective segmental pads and formed with an oil passage, said oil passage being connected to a pressurized oil supply source and feeding the lubricating oil to a sliding surface of each of said first segmental pads wherein each of said segmental pads is pivotally mounted within said housing.

2. A guide bearing device as claimed in claim 1 wherein the gap defined between each of said second segmental pads and the rotary shaft is greater in thickness than the gap defined between each of said first segmental pads and the rotary shaft.

3. A guide bearing device as claimed in claim 2 further comprising means for supporting each of said second segmental pads.

4. A guide bearing device as claimed in claim 3 wherein said supporting means of said second segmental pads comprises an adjusting bolt threadably extending through said housing.

5. A guide bearing device according to claim 1 or 2, wherein said pivotal mounting of said first segmental pads comprises a pivotal support that is independent of the pivotal mounting of the second segmental pads.

6. A guide bearing device according to claim 5, wherein the pivotal mounting of the second segmental pads comprises connecting portions extending laterally therefrom and pivotally received in side recesses of respective adjacent first segmental pads.

* * * * *